(12) United States Patent
Yamamoto et al.

(10) Patent No.: US 10,174,872 B2
(45) Date of Patent: Jan. 8, 2019

(54) GASKET

(71) Applicants: UCHIYAMA MANUFACTURING CORP., Okayama (JP); TOYOTA JIDOSHA KABUSHIKI KAISHA, Aichi (JP)

(72) Inventors: Keita Yamamoto, Okayama (JP); Kosuke Sogawa, Aichi (JP); Kenji Yamanari, Aichi (JP); Kazunori Ueno, Aichi (JP)

(73) Assignees: UCHIYAMA MANUFACTURING CORP., Okayama (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/433,582

(22) PCT Filed: Sep. 30, 2013

(86) PCT No.: PCT/JP2013/076493
§ 371 (c)(1),
(2) Date: Apr. 3, 2015

(87) PCT Pub. No.: WO2014/054561
PCT Pub. Date: Apr. 10, 2014

(65) Prior Publication Data
US 2015/0260317 A1  Sep. 17, 2015

(30) Foreign Application Priority Data
Oct. 4, 2012  (JP) .................................. 2012-221994

(51) Int. Cl.
*F16L 19/02* (2006.01)
*F16J 15/10* (2006.01)
(Continued)

(52) U.S. Cl.
CPC ......... *F16L 19/0225* (2013.01); *F16J 15/022* (2013.01); *F16J 15/061* (2013.01);
(Continued)

(58) Field of Classification Search
CPC  F16J 15/00; F16J 15/02; F16J 15/0818; F16J 15/0825; F16J 15/0831;
(Continued)

(56) References Cited

U.S. PATENT DOCUMENTS 2,191,044 A * 2/1940 Seligman .................. F28F 3/10
165/167
3,231,289 A * 1/1966 Carrell ................... F16J 15/067
277/632

(Continued)

FOREIGN PATENT DOCUMENTS

CN   201827359 U   5/2011
CN   202170997 U   3/2012
(Continued)

*Primary Examiner* — Kristina R Fulton
*Assistant Examiner* — L. Susmitha Koneru
(74) *Attorney, Agent, or Firm* — Muncy, Geissler, Olds & Lowe, P.C.

(57) ABSTRACT

A gasket having a core member having an opening, an inner seal portion made of elastic material and formed along an inner circumference of the opening, an outer seal portion made of elastic material and formed along an outer circumference of the core member. The core member has a seal-forming thin portion and an easily-deformable portion, the seal-forming thin portion being configured to form the inner seal portion at the inner circumference and to form the outer seal portion at the outer circumference, and the easily-deformable portion being provided between the inner seal portion and the outer seal portion and being configured to easily deform the core member.

12 Claims, 13 Drawing Sheets

(51) Int. Cl.
  *F16J 15/12* (2006.01)
  *F16J 15/02* (2006.01)
  *F16J 15/06* (2006.01)

(52) U.S. Cl.
  CPC .......... *F16J 15/102* (2013.01); *F16J 15/104* (2013.01); *F16J 15/122* (2013.01); *F16J 15/127* (2013.01)

(58) Field of Classification Search
  CPC .... F16J 15/0837; F16J 15/0843; F16J 15/085; F16J 15/0856; F16J 15/0862; F16J 15/0868; F16J 15/0875; F16J 15/0881; F16J 15/0887
  See application file for complete search history.

(56) References Cited

U.S. PATENT DOCUMENTS

| | | | | |
|---|---|---|---|---|
| 3,302,953 | A * | 2/1967 | Glasgow | F16J 15/127 277/611 |
| 3,578,346 | A * | 5/1971 | Jelinek | F16L 23/22 277/611 |
| 3,738,670 | A * | 6/1973 | Jelinek | F16J 15/067 277/632 |
| 3,930,656 | A * | 1/1976 | Jelinek | F02F 11/00 277/593 |
| 4,272,085 | A * | 6/1981 | Fujikawa | F16J 15/123 277/594 |
| 4,294,477 | A * | 10/1981 | Ahlstone | F16L 23/003 277/609 |
| 4,535,996 | A * | 8/1985 | Cardis | F16J 15/127 277/313 |
| 4,607,851 | A | 8/1986 | Usher | |
| 4,635,949 | A * | 1/1987 | Lucas | F16J 15/104 277/595 |
| 5,267,740 | A * | 12/1993 | Stritzke | F16J 15/0818 277/316 |
| 5,890,719 | A * | 4/1999 | Bettencourt | F02F 11/002 277/599 |
| 6,318,768 | B1 * | 11/2001 | Gehres | F16L 23/032 277/609 |
| 6,530,575 | B2 * | 3/2003 | Poquet | F02F 7/006 277/592 |
| 6,719,300 | B2 * | 4/2004 | Fujino | F16J 15/0818 277/591 |
| 8,186,691 | B2 * | 5/2012 | Baxi | F16J 15/127 277/609 |
| 8,496,253 | B2 * | 7/2013 | Goettler | F16J 15/0818 277/593 |
| 8,960,682 | B2 * | 2/2015 | Chengjie | F02F 11/002 277/590 |
| 2002/0027327 | A1 * | 3/2002 | Sugimoto | F16J 15/0818 277/592 |
| 2004/0239042 | A1 | 12/2004 | Stecher et al. | |
| 2005/0269788 | A1 * | 12/2005 | Grunfeld | F02F 11/002 277/592 |
| 2007/0222159 | A1 | 9/2007 | Baxi et al. | |
| 2007/0236008 | A1 * | 10/2007 | Kim | F16L 23/18 285/206 |
| 2008/0023923 | A1 * | 1/2008 | Kameyama | F16J 15/0825 277/595 |
| 2009/0311551 | A1 * | 12/2009 | Ueta | B21D 39/035 428/603 |

FOREIGN PATENT DOCUMENTS

| | | |
|---|---|---|
| JP | 54-76759 A | 6/1979 |
| JP | S57-122856 U1 | 7/1982 |
| JP | S60-18246 U1 | 2/1985 |
| JP | H10-317968 A | 12/1998 |
| JP | 2000-320678 A | 11/2000 |
| JP | 2002-81543 A | 3/2002 |
| JP | 2004-360913 A | 12/2004 |
| JP | 2005-195091 A | 7/2005 |
| JP | 2010-180858 A | 8/2010 |
| JP | 2010-249267 A | 11/2010 |
| JP | 2012-2170 A | 1/2012 |

* cited by examiner

GASKET

TECHNICAL FIELD

The present invention relates to a gasket provided at a connection portion of a flow path so as not to mix cooling water in the flow path and oil charged in a chain chamber, when the flow path of cooling water of a water jacket is provided so as to penetrate the chain chamber of an automobile engine.

BACKGROUND ART

A flow path of cooling water of a water jacket sometimes has to be provided so as to penetrate a chain chamber because of a layout structure of an engine and a radiator of an automobile engine (for example, referring to Patent Literatures 1 to 3). When the flow path of the water jacket penetrates the chain chamber, a chain case is provided with a flow pipe line connected to a flow pipe of the radiator. When the chain case is attached to a cylinder block or a cylinder head by fastening with bolts, the flow pipe line of the chain case communicates with a flow port of the water jacket. Thus, the flow path communicating the flow port with the flow path line is provided. A joined portion of the flow port and the flow pipe line is positioned in the chain chamber and is provided with a seal member such as an O-ring or a gasket so as to prevent cooling water from leaking to the chain chamber from the flow path and to prevent oil from flowing into the flow path from the chain chamber.

Patent Literature 1 discloses that a liquid gasket is provided for the joined portion. Patent Literature 2 discloses that two O-rings are concentrically provided for the joined portion, an inner O-ring is used for preventing leakage of cooling water and an outer O-ring is used for preventing leakage of oil. Patent Literature 3 discloses that a sheet-like seal member having an inner water-proof seal portion and an outer oil seal portion is provided for the joined portion. These embodiments prevent leakage of cooling water into the chain chamber and flowing of oil into the flow path at the joined portion in the chain chamber. Patent Literature 4 discloses a gasket provided for a joined face of a connection portion of gas piping, not for an automobile engine, the gasket comprising a sheet-like gasket at an inner circumference and a sheet-like gasket at an outer circumference.

CITATION LIST

Patent Literature

PTL 1: Japanese Patent Publication (not examined) No. H10-317968
PTL 2: Japanese Patent Publication (not examined) No. 2010-180858
PTL 3: Japanese Patent Publication (not examined) No. 2012-2170
PTL 4: Japanese Patent Publication (not examined) No. 2010-249267

SUMMARY OF INVENTION

Technical Problem

In Patent Literature 1, when a chain case is removed for maintenance (exchange of a chain) in the chain chamber, it is bothersome to remove a coated liquid gasket and coat a liquid gasket again. In Patent Literature 2, two kinds of O-rings are required to be prepared and to be mounted to ring grooves, respectively, in case of fastening a chain case or of the above-mentioned maintenance. In Patent Literature 3, nuts are screwed from outside of the chain case to a pair of stud bolts provided for a side wall portion at the front end around a cooling water outlet of the cylinder head, respectively, thereby a joined portion is formed between the side wall portion at the front end and a water communication pipe of the chain case. The seal member (gasket) is provided for the joined portion in a compressed condition, and the cooling water outlet and the water communication pipe are communicated, thereby constituting an outlet path of cooling water. In this case, a base body of the seal member is considered to be constituted with a sheet-like member. Therefore, when an attachment portion (a joined portion) causes heat expansion due to the heat generated at the time of operating an engine or distortion at the time of fastening with a bolt and a nut, the base body does not follow the heat expansion or the distortion, so that the seal ability of the joined portion may be deteriorated. The gasket disclosed in Patent Literature 4 comprises the sheet-like gasket at the inner circumference and the sheet-like gasket at the outer circumference and is provided between a pair of flanges fastened with a bolt and a nut under compression. However, Patent Literature 4 does not specifically refer to a problem such as heat expansion or distortion of the flange portion.

The present invention is proposed in view of the above-mentioned problems and has an object to provide a gasket capable of keeping seal ability of the inner seal portion and the outer seal portion and capable of inhibiting influence over the seal ability caused by heat expansion or distortion of an attachment face.

Solution to Problem

In one embodiment of the present invention, a gasket is configured to seal a space between two members by being interposed between attachment faces of the two members and by being compressed therebetween. The gasket has a core member being in the shape of a flat plate and having an opening, an inner seal portion made of elastic material and formed along an inner circumference of the opening, and an outer seal portion made of elastic material and formed along an outer circumference of the core member. The core member has a seal-forming thin portion and an easily-deformable portion, the seal-forming thin portion being configured to be thinner than other portions of the core member so as to form the inner seal portion at the inner circumference and to form the outer seal portion at the outer circumference, and the easily-deformable portion being provided between the inner seal portion and the outer seal portion and being configured to easily deform the core member.

In the embodiment, the inner circumference of the opening is sealed by the inner seal portion, thereby preventing an objective medium to be sealed flowing through the opening from leaking to an outer circumferential side. The outer circumference is sealed by the outer seal portion, thereby preventing another objective medium to be sealed flowing outside of the outer circumference from flowing into the opening. The structure is simple and the handling is easy, though a dual seal structure is constituted by only one gasket. Further, with the easily-deformable portion in the sheet-like core member, the sheet-like core member deforms in accordance with heat expansion or distortion of the attachment face (a flange face, for example) to which the gasket is attached and absorbs the heat expansion or the distortion, thereby the gasket is flexibly applied and keeps the seal ability. The inner seal portion and the outer seal portion to which high surface pressure is applied while being provided between the two objective members to be sealed are remarkably affected by the attachment face. However, such influence is absorbed by deformation of the easily-deformable portion provided between the inner seal portion and the outer seal portion and is inhibited to be transferred to the other seal portion, thereby keeping the seal ability.

The easily-deformable portion of the gasket of one embodiment of the present invention can have a thin portion or a through hole. In the embodiment, the sheet-like core member following the heat expansion or distortion as mentioned above is effectively deformed because of the thin portion or the through hole and influence over the seal ability in the inner seal portion and the outer seal portion is inhibited. When the sheet-like core member, made of metal, can be easily produced together with the thin portion or the through hole by a sheet-metal processing, thereby reducing the weight of the sheet-like core member.

In one embodiment of the gasket of the present invention, either the thin portion or the through hole can be continuously formed with the seal-forming thin portion of the inner seal portion and the seal-forming thin portion of the outer seal portion.

In the embodiment, the thin portion or the through hole is continuously formed with the seal-forming thin portion, so that the core member is easily processed. The thin portion or the through hole is connected with the seal-forming thin portion, thereby the sheet-like core member is easily deformed following the heat expansion and the distortion of the attachment face of the sheet-like core member.

In one embodiment of the gasket of the present invention, either the thin portion or the through hole can have a joint portion made of elastic material, the joint portion being configured to be joined with the inner seal portion and the outer seal portion.

In the embodiment, in case that the inner seal portion and the outer seal portion are constituted with a rubber molded body, when rubber material is injected into an injection port with the sheet-like core member processed in a predetermined shape and positioned in a cavity of a mold, the inner seal portion and the outer seal portion can be simultaneously molded via the joint portion even if there is only one injection port.

In one embodiment of the gasket of the present invention, a plurality of fastening bolt holes can be provided between the inner seal portion and the outer seal portion.

In the embodiment, a seal portion is not required to be provided around the fastening bolt hole because the inner and the outer seal portions are provided.

In one embodiment of the gasket of the present invention, the easily-deformable portion can be independently formed from the fastening bolt holes.

In the embodiment, the deformation of the easily-deformable portion does not affect the fixing function of the objective member to be sealed and the gasket in case of fastening with a bolt, thereby exerting the above-mentioned seal ability of the gasket of the embodiment of the present invention.

In one embodiment of the gasket of the present invention, the easily-deformable portion can be formed between the fastening bolt holes. As the easily-deformable portion is provided for a position apart from the fastening bolt holes, fastening of the bolts causes stress at the position, thereby the gasket can be flexibly adapted to heat expansion or distortion on the attachment face in the embodiment. At the bolt fastening portion largely affected by deformation of the attachment face, the influence is inhibited from being transferred to the other portion, thereby keeping the seal ability.

In one embodiment of the gasket of the present invention, the easily-deformable portion can be formed between the inner seal portion and the fastening bolt hole or between the outer seal potion and the fastening bolt hole.

As mentioned above, as the easily-deformable portion is provided for a position apart from the fastening bolt holes, fastening of the bolts causes stress at the position, thereby the gasket can be flexibly adapted to the heat expansion or the distortion on the attachment face in the embodiment. The influence caused by fastening with a bolt is inhibited from being transferred to the other portion, thereby keeping the seal ability.

In one embodiment of the gasket of the present invention, the easily-deformable portion can be formed at a plurality of regions of the core member.

The above-mentioned embodiment can be appropriately adapted even when there are a plurality of portions in which heat expansion or distortion is easily generated.

Advantageous Effects of Invention

The gasket of the embodiment of the present invention can appropriately keep seal ability of the inner seal portion and the outer seal portion with a simple structure. In addition, the sheet-like core member of the gasket has the easily-deformable portion, thereby effectively inhibiting influence over the seal ability, caused by heat expansion or distortion of the attachment face.

BRIEF DESCRIPTION OF DRAWINGS

FIG. 4b is a sectional view taken in the directions of the arrow along the line C-C of FIG. 4a and FIG. 4c is a sectional view taken in the directions of the arrow along the line D-D of FIG. 4a.

FIG. 5b is a sectional view taken in the directions of the arrow along the line E-E of FIG. 5a and FIG. 5c is a sectional view taken in the directions of the arrow along the line F-F of FIG. 5a.

FIG. 6b is a sectional view taken in the directions of the arrow along the line G-G of FIG. 6a and FIG. 6c is a sectional view taken in the directions of the arrow along the line H-H of FIG. 6a.

FIG. 7a is a plan view showing another modification of the gasket of the above-mentioned embodiment and FIG. 7b is a sectional view taken in the directions of the arrow along the line I-I of FIG. 7a.

FIG. 8a is a plan view showing another modification of the gasket of the above-mentioned embodiment and FIG. 8b is a sectional view taken in the directions of the arrow along the line J-J of FIG. 8a.

FIG. 9b is a sectional view taken in the directions of the arrow along the line K-K of FIG. 9a, and FIG. 9c is a sectional view taken in the directions of the arrow along the line L-L of FIG. 9a.

FIG. 10b is a sectional view taken in the directions of the arrow along the line M-M of FIG. 10a and FIG. 10c is a sectional view taken in the directions of the arrow along the line N-N of FIG. 10a.

FIG. 11b is a sectional view taken in the directions of the arrow along the line O-O of FIG. 11a and FIG. 11c is a sectional view taken in the directions of the arrow along the line P-P of FIG. 11a.

FIG. 12b is a sectional view taken in the directions of the arrow along the line Q-Q of FIG. 12a and FIG. 12c is a sectional view taken in the directions of the arrow along the line R-R of FIG. 12a.

DESCRIPTION OF EMBODIMENTS

Figure 1:
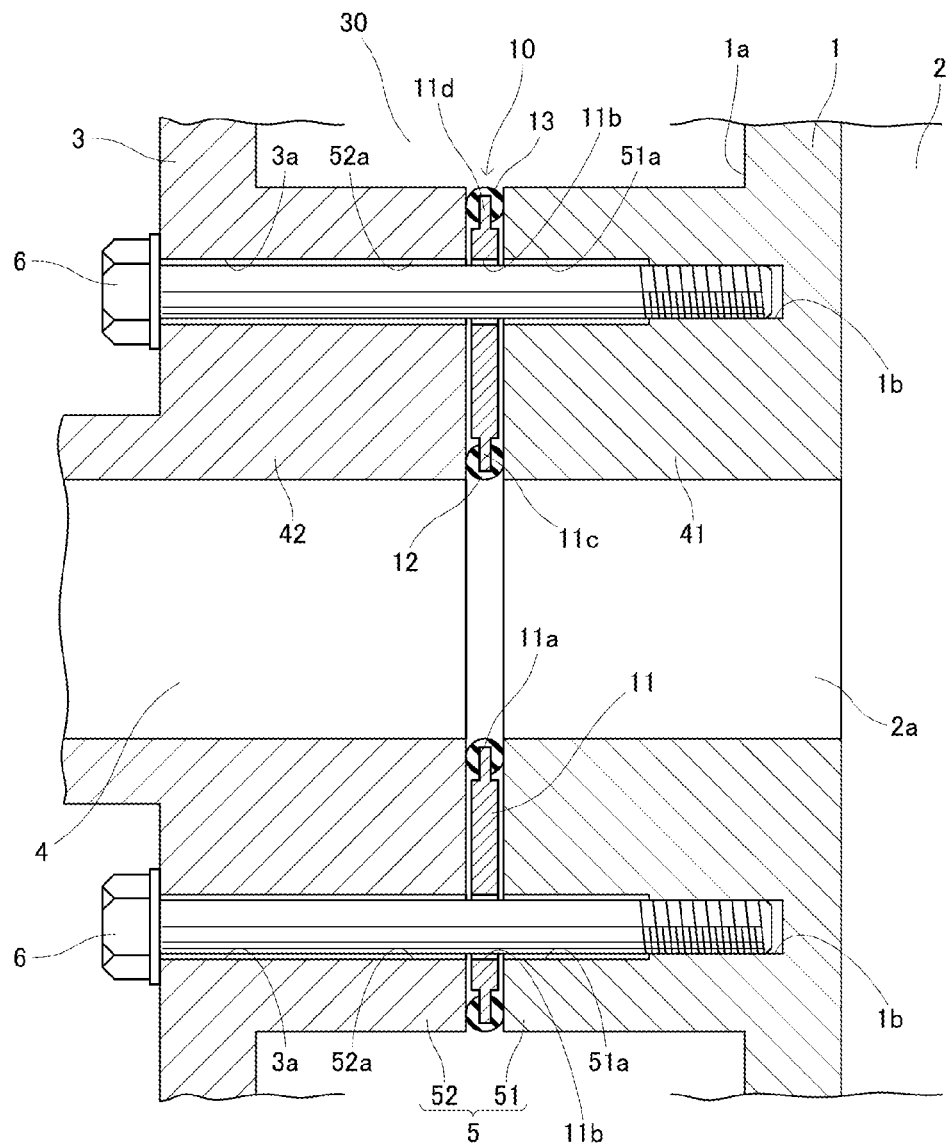
FIG. 1 is a longitudinal sectional view showing that a gasket of the present invention is provided in a connection portion of a drain path penetrating a chain case from a water jacket of an engine.

The embodiment of the present invention is explained referring to the attached drawings. An example of the application of the gasket of the present invention is explained referring to FIG. 1. FIG. 1 shows that a gasket 10 of the embodiment of the present invention is provided for a connection portion 5 of a drain path 4 (flow path) penetrating a chain case 3, i.e. a front cover, to a radiator (not shown) from a water jacket 2 provided for a cylinder block 1 of an automobile engine. A drain port 2a of the water jacket 2 is provided for the cylinder block 1 and a pipe 41 on the cylinder block 1 side is provided for the drain port 2a. A flange portion 51 is provided at the leading end of the pipe 41. The peripheral portion of the chain case 3 is fixed to the front side of the cylinder block 1 with a bolt, not shown, and a chain chamber 30 is formed between the chain case 3 and the front wall 1a (water jacket wall) of the cylinder block 1. A chain or a timing belt, not shown, for transmitting power from a crank shaft to another auxiliary machine is provided in the chain chamber 30. Lubricant oil, not shown, is filled in the chain chamber 30 for smoothly transmitting power with a chain and the like.

A pipe 42 on the chain case 3 side is provided so as to penetrate the chain case 3 at a position corresponding to the pipe line 41 on the cylinder block 1 side. A flange portion 52, facing the flange portion 51 on the cylinder block 1 side, is formed on the base side of the pipe 42, on the cylinder block 1 side, thereby constituting the connection portion 5 with both flange portions 51, 52. The flange portions 51, 52 are substantially in the form of a lozenge with circular angles. The flange portion 51 on the cylinder block 1 side has two bolt holes 51a, 51a in the vicinity of two facing angles on diagonal lines of the lozenge with greater length. Two bolt holes 52a, 52a are provided for the flange portion 52 on the chain case 3 side so as to penetrate the chain case 3 while communicating with bolt holes 3a, 3a of the chain case 3 at positions corresponding to the bolt holes 51a, 51a. Two bolts 6, 6 for forming a drain path are screwed from the outside of the chain case 3 through the bolt holes 3a, 3a of the chain case 3, the bolt hole 52a of the flange portion 52 and the bolt hole 51a of the flange portion 51, to two female screw portions 1b, 1b provided on the bottom side of the bolt hole 51a of the front wall 1a of the cylinder block 1. At the time of fastening with two bolts 6, 6, the gasket 10 of the embodiment of the present invention is provided under pressure between the mating faces of the flange portions 51, 52. Thus, the pipes 41, 42 are connected via the flange portions 51, 52 and a drain path 4 is formed from the drain port 2a of the water jacket 2 to the radiator, not shown.

A stud bolt, not shown, can be fixed to the front wall 1a of the cylinder block 1 and a nut, not shown, can be screwed to the stud bolt from the outside of the chain case 3, without using the bolts 6, 6 for forming a drain path shown in the figure. In the figure, the drain side of the water jacket 2 is exemplified; however, the above-mentioned structure can be provided for a water supply side. In the figure, the pipe 42 including the flange portion 52 extending into the cylinder block 1 side is provided for the chain case 3 in a projecting manner. However, the drain path 4 can be formed without having such a projecting pipe 42. In the figure, the drain path 4 is integrally provided on the outer side of the chain case 3. However, another pipe can be provided on the outer side of the chain case 3 so as to be watertightly connected with the drain path 4.

Figure 2:
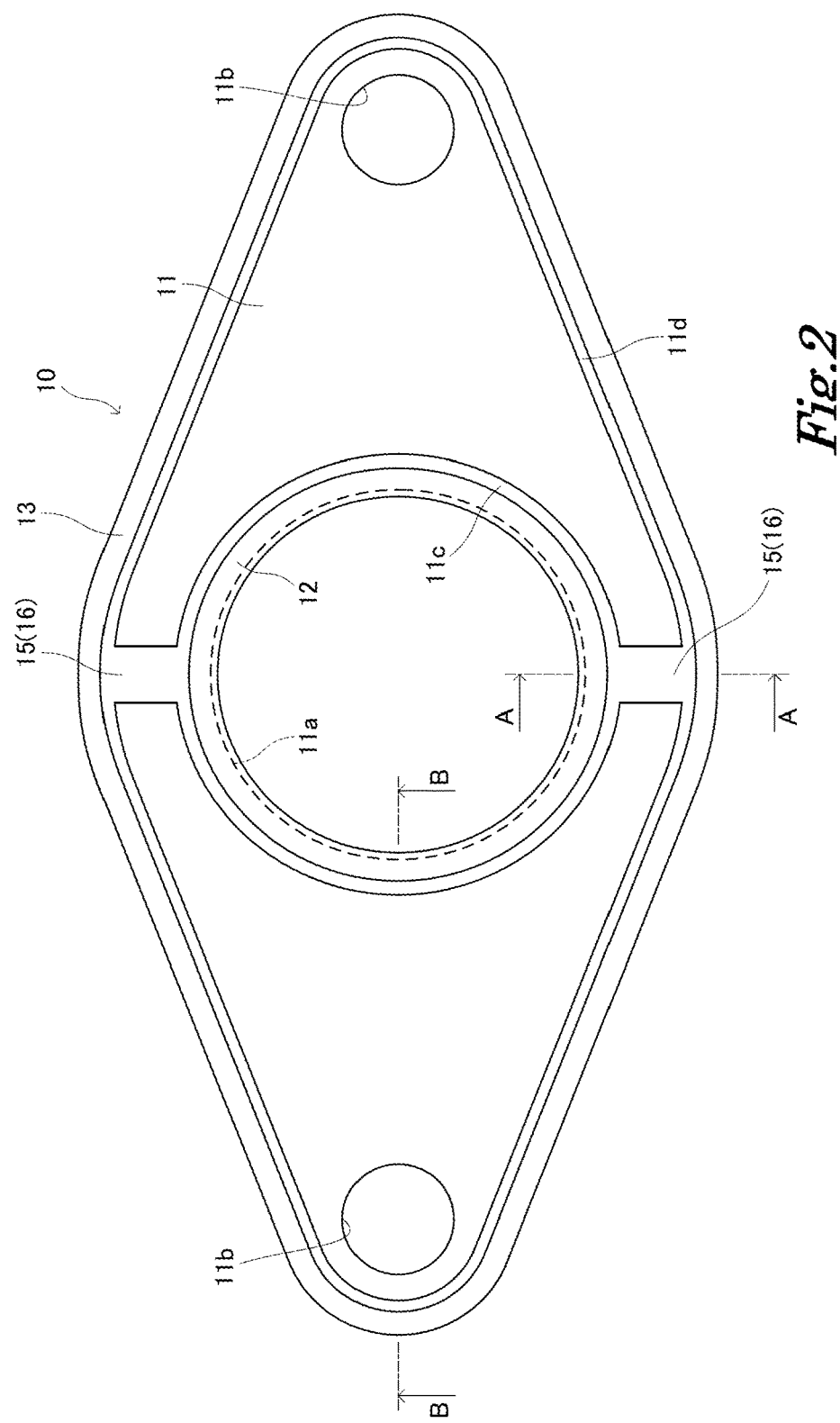
FIG. 2 is a plan view showing the first embodiment of a gasket of the present invention.
Figure 3A:
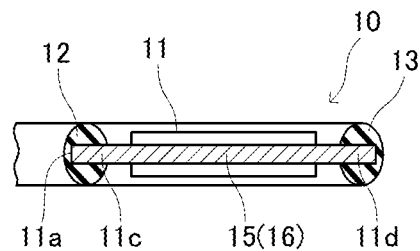
FIG. 3a is a sectional view taken in the directions of the arrow along the line A-A of FIG. 2
Figure 3B:
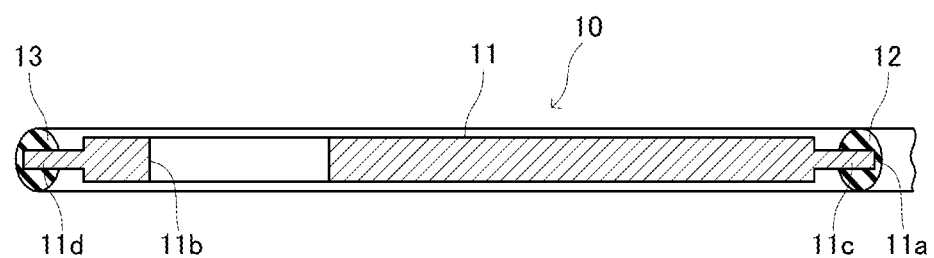
FIG. 3b is a sectional view taken in the directions of the arrow along the line B-B of FIG. 2.

The first embodiment of the gasket provided for the connection portion 5 is explained also referring to FIG. 2, FIG. 3a and FIG. 3b. FIG. 4 to FIG. 9 show modifications of the first embodiment. In the modifications, an easily-deformable portion 15 is constituted with a thin portion 16 of the core member 11 in the form of a sheet.

The gasket 10 of the first embodiment shown in FIG. 2, FIG. 3a and FIG. 3b has the core member 11 having an opening 11a, an inner seal portion 12 made of elastic material and formed along the inner circumference of the opening 11a, and an outer seal portion 13 made of elastic material and formed along the outer circumference of the core member 11. The elastic material of the inner seal portion 12 and the outer seal portion 13 is rubber. The core member 11 is a metal plate and the outer shape is substantially lozenged in conformity with the outer shape of the flange portions 51, 52. The opening 11a is circular of which center is concentric with the intersection of diagonal lines of the lozenge outer shape and the circular shape is substantially in conformity with the sectional shape of the drain path 4. The core member 11 has fastening bolt holes 11b, 11b at positions corresponding to the bolt holes 51a, 52a of the flange portions 51, 52. The outer shape of the core member 11, the opening 11a and the fastening bolt holes 11b, 11b are formed by a punching process.

The core member 11 in the form of a sheet has seal-forming thin portions 11c, 11d for forming the inner seal portion 12 and the outer seal portion 13. The core member 11 further has an easily-deformable portion 15 for facilitating deformation of the core member 11 between the inner and the outer seal portions 12, 13. The easily-deformable portions 15 in this embodiment is constituted with the thin portion 16 continuously formed with the inner seal-forming thin portion 11c and the outer seal-forming thin portions 11d so as to have the same thickness thereof. The thin portion 16 is formed at two middle portions between the fastening bolt holes 11b, 11b independently from the fastening bolt holes 11b, 11b, namely the thin portion 16 is provided at a position which does not affect the fastening bolt holes 11b, 11b. The thin portion 16 is continuously formed from the seal-forming thin portions 11c, 11d, respectively. The thin portions 11c, 11d, 15, 15 are formed by pressing the original metal sheet of the core member 11 from both sides. The core member processed in a predetermined form is provided in a cavity of a mold, unvulcanized rubber material is injected, and molded by vulcanization. Then, the inner seal portion 12 and the outer seal portion 13 are integrally formed with the seal-forming thin portions 11c, 11d so as to cover the circumference thereof on the front face and the back face.

Elastic material of the seal portions 12, 13 can be soft resin in addition to rubber material. The inner seal portion 12 and the outer seal portion 13 can be integrally formed on the front face and the back face of the seal-forming thin portions 11c, 11d separately so as not to cover the circumference thereof.

The above-mentioned gasket 10 is provided under pressure between the flange portions 51, 52 of the connection portion 5 by fastening a bolt, not shown, at the periphery of the chain case 3 and the two bolts 6 for forming a drain path to the cylinder block 1, as shown in FIG. 1. The chain chamber 30 is formed between the chain case 3 and the front wall 1a of the cylinder block 1 by attaching the chain case 3 with the bolt and lubricant oil, not shown, is filled in the chain chamber 30. The drain path 4 is formed by connecting the flange portions 51, 52 interposing the gasket 10. Cooling water flows though the drain path 4 from the water jacket 2 to the radiator, not shown. As the gasket 10 is provided under pressure between the flange portions 51, 52, the inner seal portion 12 and the outer seal portion 13 are compressed in the thickness direction of the core member 11 in the form of a sheet and contact under pressure the opposing faces of the flange portions 51, 52 by the reaction force. Cooling water, not shown, flowing in the drain path 4 is prevented from leaking out of the chain chamber 30 through the connection portion 5. Oil charged in the chain chamber 30 is prevented from flowing to the drain path 4 from the connection portion 5 because of the outer seal portion 13 contacting under pressure the opposing faces of the flange portions 51, 52.

Although the connection portion 5 of the pipes 41, 42 is provided in the chain chamber 30, oil in the chain chamber 30 and cooling water flowing in the drain path 4 are surely prevented from being mixed, thereby increasing variation of the layout structure of an engine. The core member 11 in the form of a sheet has the easily-deformable portion 15 constituted with the thin portion 16 and correspondingly deforms even if the flange portions 51, 52 generate heat expansion or distortion, thereby the seal ability of the inner seal portion 12 and the outer seal portion 13 is not affected. The easily-deformable portion 15 is provided around the middle between the fastening bolt holes 11b, 11b, so that the distance between the inner and the outer seal portions 11c, 11d is smallest, thereby effectively achieving the above-mentioned deformation. Fixing function of the flange portions 51, 52 via the gasket 10 by being fastened with the bolts 6, 6 for forming a drain path is not affected by deformation of the easily-deformable portion 15 because the easily-deformable portion 15 is formed in a position other than the fastening bolt holes 11b, 11b, thereby accurately keeping the seal ability. A portion in the vicinity of the fastening bolt holes 11b, 11b is made of rigid material so as to keep the axial force of the bolts 6, 6 for forming a drain path and the fastening bolt holes 11b, 11b are formed between the inner and the outer seal portions 12, 13, thereby the easily-deformable portion 15 effectively achieves the above-mentioned effects.

Figure 4A:
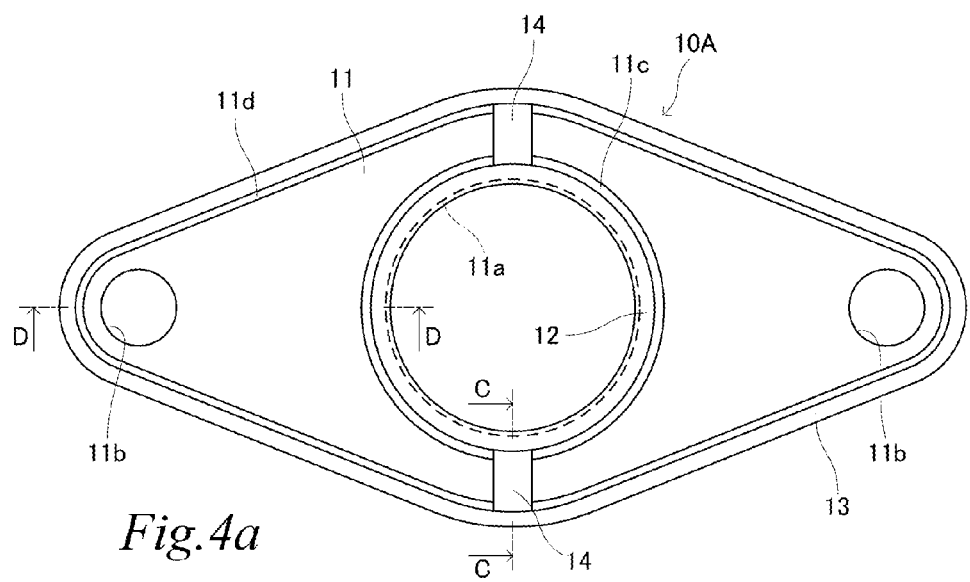
FIG. 4a is a plan view showing a modification of the gasket of the above-mentioned embodiment.
Figure 4B:
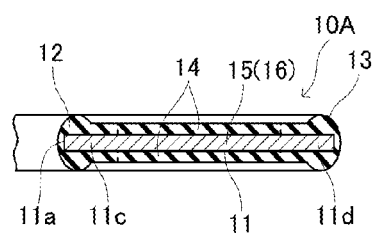
Figure 4C:
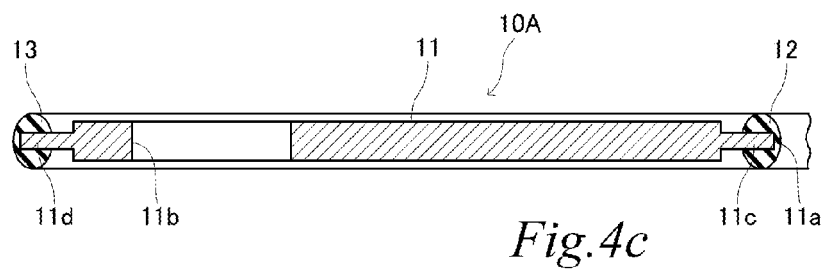

FIG. 4a, FIG. 4b and FIG. 4c show a modification of the gasket of the first embodiment. The whole shape of a gasket 10A, the inner and outer seal-forming thin portions 11c, 11d, the inner and the outer seal portions 12, 13 and the thin portion 16 constituting the easily-deformable portion 15 of the gasket 10A in the modification are formed in the same manner as those of the gasket 10 shown in FIG. 2 and FIG. 3. The gasket 10A is different from the gasket 10 in that a joint portion 14 made of elastic material and connected with the inner seal portion 12 and the outer seal portion 13 is provided on both sides of the thin portion 16, namely the easily-deformable portion 15. The joint portion 14 is made of rubber material like the inner seal portion 12 and the outer seal portion 13. In case of vulcanization molding as mentioned above, unvulcanized rubber is injected from one port and the inner seal portion 12 and the outer seal portion 13 are simultaneously molded by vulcanization via the joint portion 14. In this case, the joint portion 14 is molded so as to have thickness smaller than that of the tops of the inner seal portion 12 and the outer seal portion 13. The inner seal portion 12 and the outer seal portion 13, being connected via the joint portion 14, are integrally fixed with the core member 11 in the form of a sheet and are restrained by the core member 11, thereby achieving the seal ability independently without being affected by the deformation caused by the above-mentioned compression. The above-mentioned easily-deformable portion 15 (thin portion 16) achieves the above-mentioned effect together with the joint portion 14.

Other structures are the same as the embodiment shown in FIG. 2, FIG. 3a, FIG. 3b, the same reference numerals are allotted to the common portions and the explanation is omitted here.

Figure 5A:
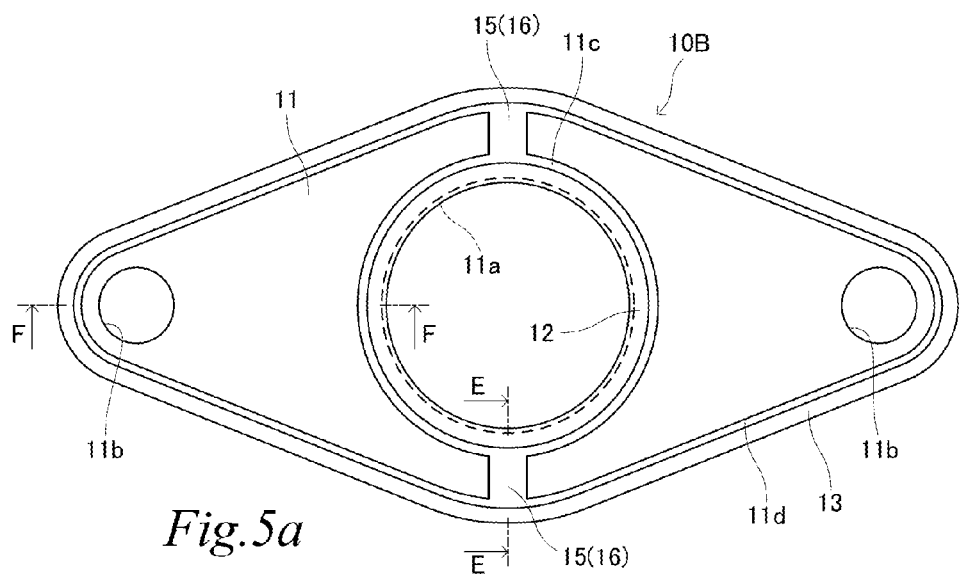
FIG. 5a is a plan view showing another modification of the gasket of the above-mentioned embodiment.
Figure 5B:
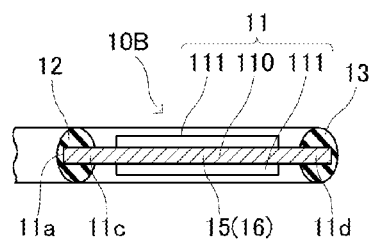
Figure 5C:
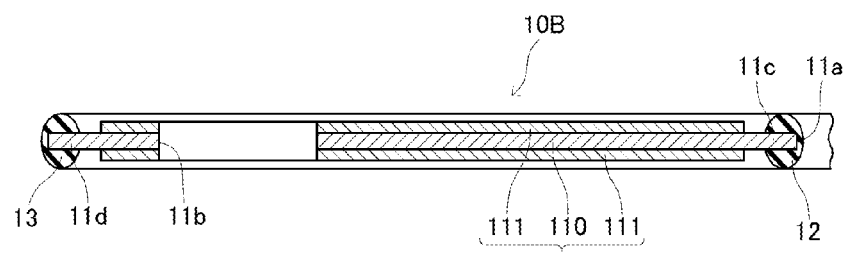

FIG. 5a, FIG. 5b and FIG. 5c show another modification of the gasket of the first embodiment. The whole shape of a gasket 10B, the inner and outer seal-forming thin portions 11c, 11d, the inner and the outer seal portions 12, 13 and the thin portion 16 constituting the easily-deformable portion 15 of the gasket 10B in the modification are formed in the same manner as those of the above-mentioned gaskets 10, 10A. The gasket 10B in this modification is different from the above-mentioned embodiments in that the core member 11 in the form of a sheet is a three-layer structure of a base plate 110, and side plates 111, 111 fixed on two faces. A portion which is solely constituted with the base plate 110 without the side plates 111, 111 constitutes the thin portion 16, namely the easily-deformable portion 15. The base plate 110 and the side plates 111, 111 are fixed by welding or caulking. The base plate 110 and the side plates 111, 111 can be metal sheets of the same material or metal sheets of different materials. In the latter case, if a low-cost metal plate is used for the side wall 111, the production cost is reduced. When the core member 11 has a three-layer structure of the base plate 110 and the side plates 111, 111, the basic function is the same as those of the above-mentioned embodiments and the effect of the easily-deformable portion 15, thin portion 16, is achieved in the same manner as those of the above-mentioned embodiments.

Also in this modification, the joint portion 14 as mentioned in the embodiment of FIG. 4 can be provided on both sides of the thin portion 16 constituting the easily-deformable portion 15. Other structures are the same as those of the above-mentioned embodiments, the same reference numerals are allotted to the common portions and the explanation is omitted here.

Figure 6A:
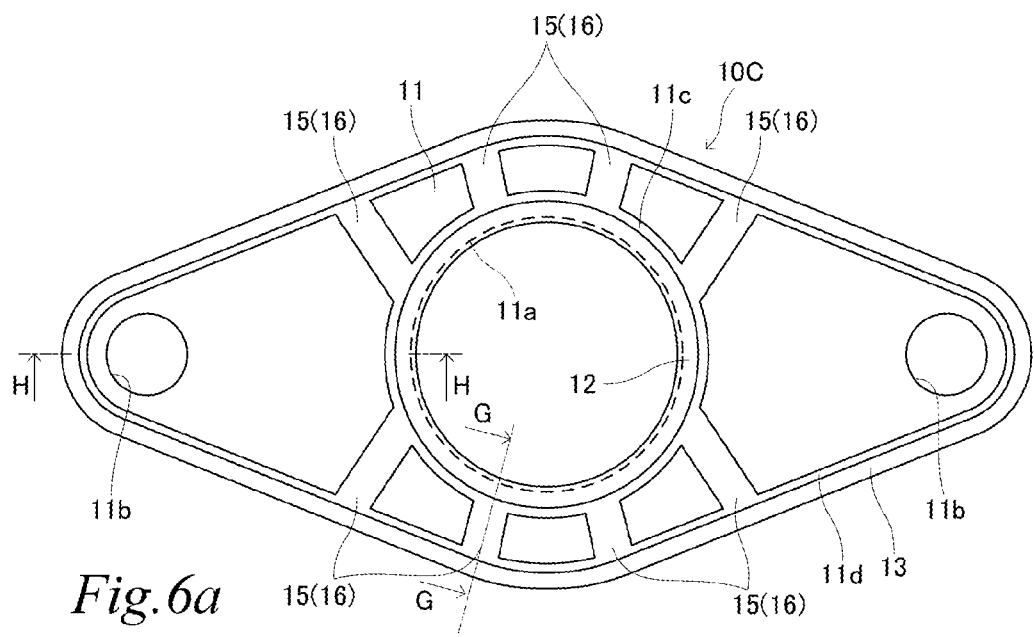
FIG. 6a is a plan view showing another modification of the gasket of the above-mentioned embodiment.
Figure 6B:
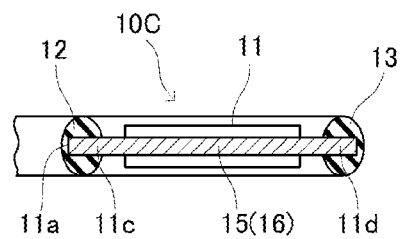
Figure 6C:
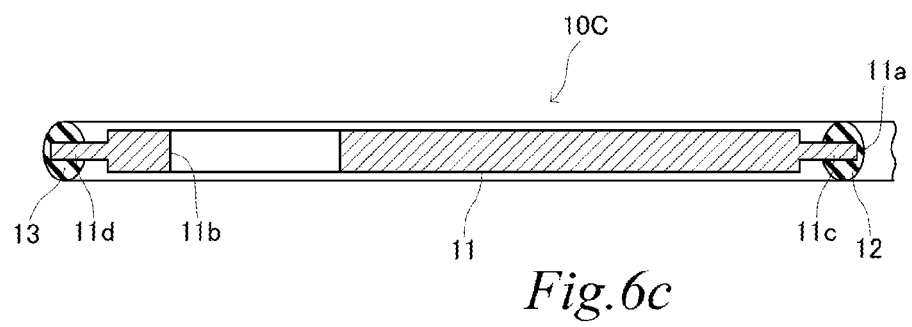

FIG. 6a, FIG. 6b and FIG. 6c show another modification of the gasket of the first embodiment. The whole shape of a gasket 10C, the inner and outer seal-forming thin portions 11c, 11d, and the inner and the outer seal portions 12, 13 of the gasket 10C in the modification are formed in the same manner as those of the above-mentioned embodiments. The thin portion 16 constituting the easily-deformable portion 15 of the gasket 10C is different from those in the above-mentioned embodiments. Four thin portions 16 are provided between the fastening bolt holes 11b, 11b on both sides so as to be connected with the inner and the outer seal-forming thin portions 11c, 11d, namely the thin portion 16 is provided at eight positions. Such a thin portion 16 achieves the same effect as those of the above-mentioned embodiments and reduces the weight of the core member 11 in the form of a sheet. Such an easily-deformable portion 15 can be selectively used for the flange portions 51, 52, referring to FIG. 1, in which heat expansion or distortion is easily caused.

Also in this modification, the joint portion 14 as mentioned in the embodiment of FIG. 4 can be provided on both sides of the thin portion 16 constituting the easily-deformable portion 15. In addition, the core member 11 in the form of a sheet can be a three-layer structure and a portion solely constituted with the base plate 110 can be used for the seal-forming thin portions 11c, 11d and the thin portion 16, namely the easily-deformable portion 15, as shown in FIG. 5. Other structures are the same as those of the above-mentioned embodiments, the same reference numerals are allotted to the common portions and the explanation is omitted here.

Figure 7A:
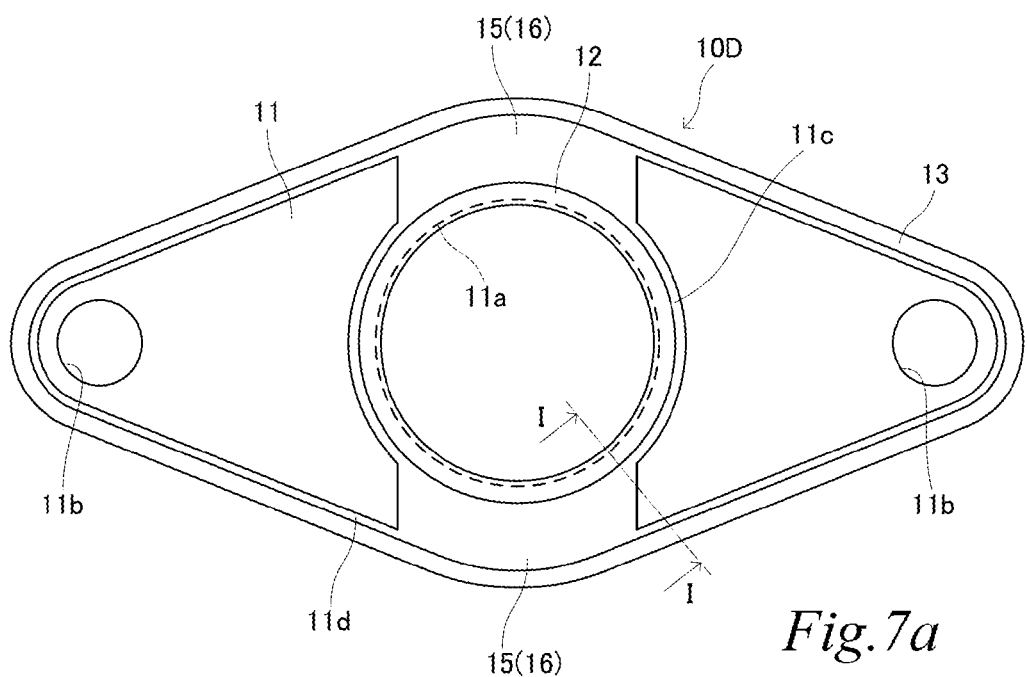
Figure 7B:
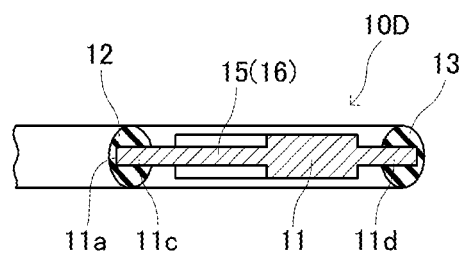

FIG. 7a and FIG. 7b show another modification of the gasket of the first embodiment. The whole shape of a gasket 10D, the inner and outer seal-forming thin portions 11c, 11d, and the inner and the outer seal portions 12, 13 of the gasket 10D in the modification are formed in the same manner as those of the above-mentioned embodiments. The thin portion 16, formed as the easily-deformable portion 15 and provided at two positions, is continuously formed with the seal-forming thin portion 11c, 11d and has width larger than that of the embodiment shown in FIG. 2. Such a thin portion 16 with larger width achieves the same effect as those of the above-mentioned embodiments and reduces the weight of the core member 11 in the form of a sheet. Such an easily-deformable portion 15 can be selectively used for the flange portions 51, 52, referring to FIG. 1, and in which heat expansion or distortion is easily caused, as shown in the embodiment in FIG. 6.

Also in this modification, the joint portion 14 as mentioned in the embodiment of FIG. 4 can be provided on both sides of the thin portion 16 constituting the easily-deformable portion 15. In addition, the core member 11 in the form of a sheet can be a three-layer structure and a portion solely constituted with the base plate 110 can be used for the seal-forming thin portions 11c, 11d and the thin portion 16, namely the easily-deformable portion 15 as shown in FIG. 5. Other structures are the same as those of the above-mentioned embodiments, the same reference numerals are allotted to the common portions and the explanation is omitted here.

Figure 8A:
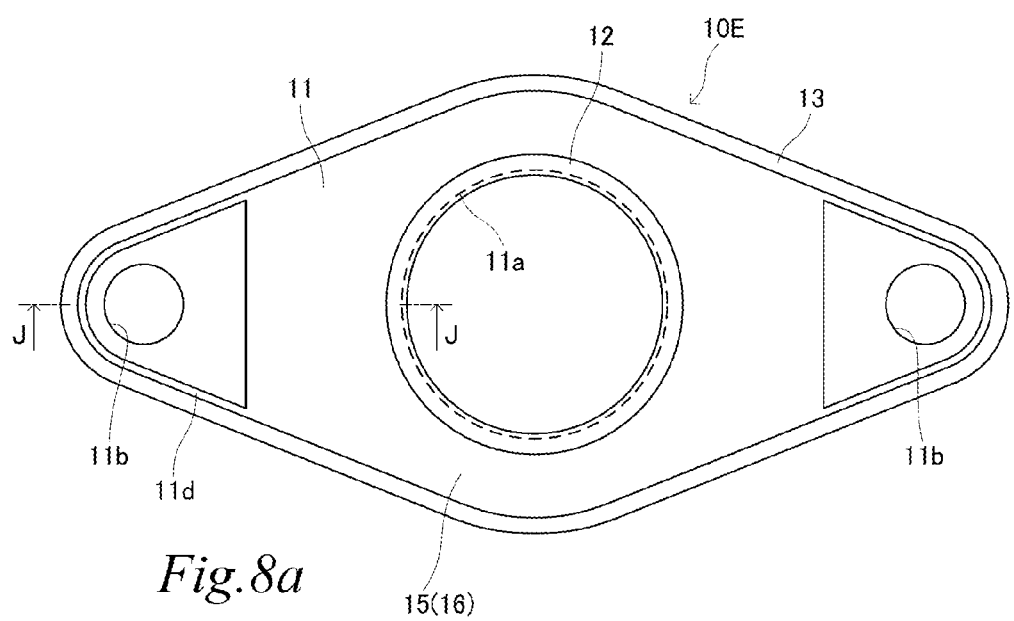
Figure 8B:
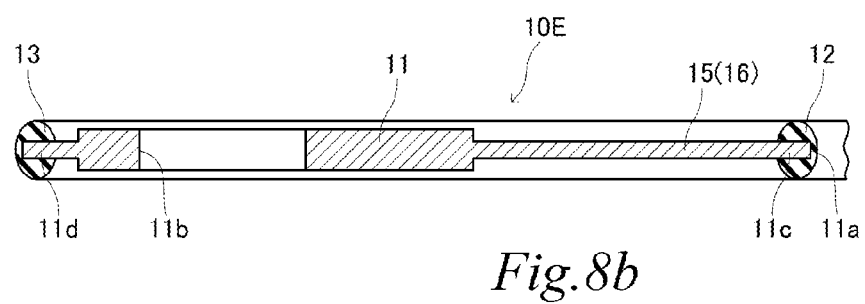

FIG. 8a and FIG. 8b show another modification of the gasket of the first embodiment. The whole shape of a gasket 10E, the inner and outer seal-forming thin portions 11c, 11d, and the inner and the outer seal portions 12, 13 of the gasket 10E in the modification are formed in the same manner as those of the above-mentioned embodiments. The thin portion 16, constituting the easily-deformable portion 15, is continuously formed with the seal-forming thin portion 11c, 11d and is widely formed so as to surround the inner seal portion 12 except the vicinity of the fastening bolt holes 11b, 11b. Such a wide thin portion 16 remarkably achieves the effect as mentioned above and further reduces the weight of the core member 11 in the form of a sheet. Such an easily-deformable portion 15 can be selectively used when a gasket is used for the flange portions 51, 52, referring to FIG. 1, and the like which easily generate heat expansion or distortion, as shown in FIG. 6 and FIG. 7.

Also in this modification, the joint portion 14 as shown in the embodiment of FIG. 4 can be provided on both sides of the thin portion 16, formed as the easily-deformable portion 15. In addition, the core member 11 can be a three-layer structure and a portion solely constituted with the base plate 110 can be used for the seal-forming thin portions 11c, 11d and the thin portion 16, formed as the easily-deformable portion 15, as shown in FIG. 5. Other structures are the same as those of the above-mentioned embodiments, the same reference numerals are allotted to the common portions and the explanation is omitted here.

Figure 9A:
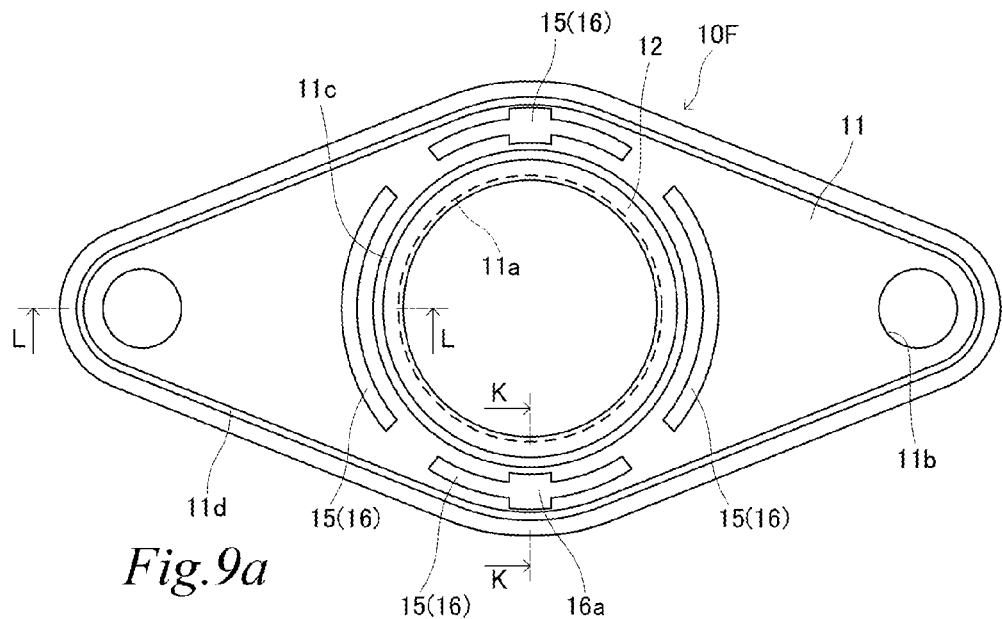
FIG. 9a is a plan view showing another modification of the gasket of the above-mentioned embodiment.
Figure 9B:
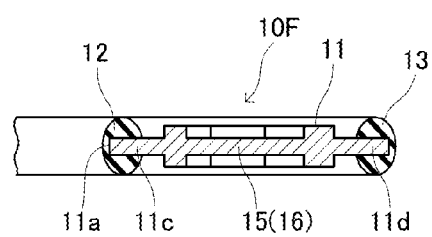
Figure 9C:
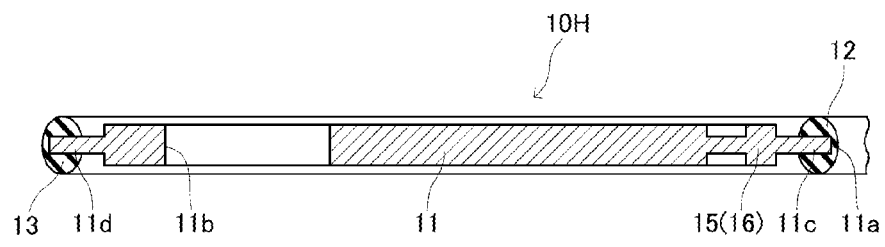

FIG. 9a, FIG. 9b and FIG. 9c show another modification of the gasket of the first embodiment. The whole shape of a gasket 10F, the inner and outer seal-forming thin portions 11c, 11d, and the inner and the outer seal portions 12, 13 of the gasket 10F in the modification are formed in the same manner as those of the above-mentioned embodiments. The thin portion 16 constituting the easily-deformable portion 15 is not continuously formed with the seal-forming thin portion 11c or 11d and is intermittently formed at four positions around the inner seal portion 12. The thin portion 16 formed at four positions is a circular arc in the form of a concave groove, the arc being concentric with the opening 11a and having the same diameter as that of the opening 11a. The thin portion 16 includes a wide portion 16a at a position where the inner seal portion 12 and the outer seal portion 13 become closest. Such an easily deformable portion 15 has the effect as mentioned above. The thin portion 16 includes the wide portion 16a at the position where the inner seal portion 12 and the outer seal portion 13 become closest, thereby achieving the effect of the above-mentioned deformation.

Also in the modification, the core member 11 in the form of a sheet can be a three-layer structure and a portion solely constituted with the base plate 110 can be used for the seal-forming thin portions 11c, 11d and the thin portion 16, formed as the easily-deformable portion 15, as shown in FIG. 5. Other structures are the same as those of the above-mentioned embodiments, the same reference numerals are allotted to the common portions and the explanation is omitted here.

Figure 10A:
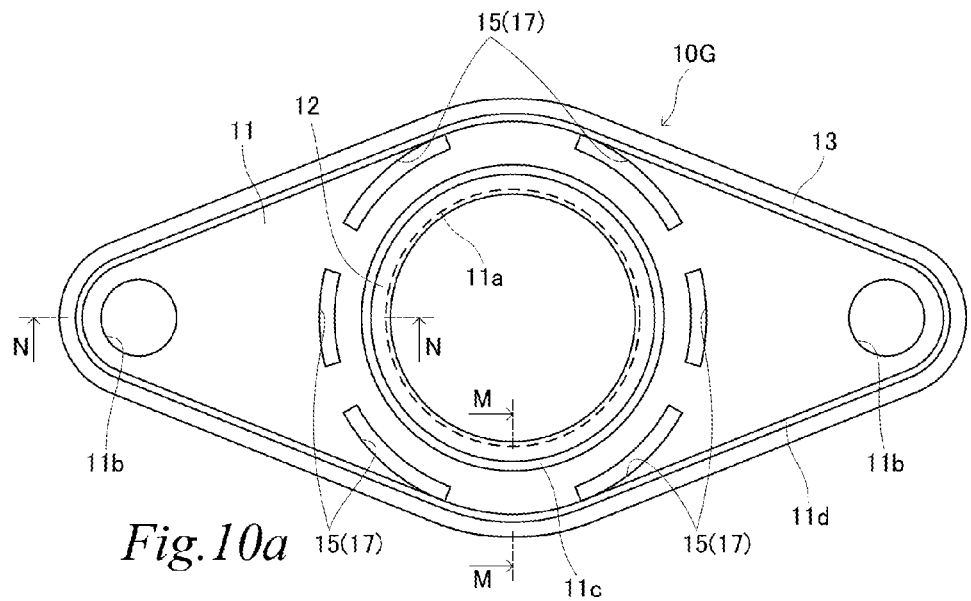
FIG. 10a is a plan view showing a gasket of the second embodiment of the present invention.
Figure 10B:
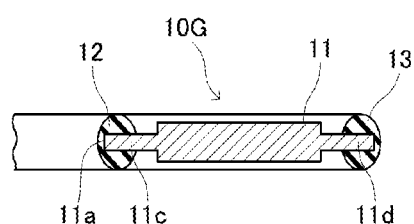
Figure 10C:
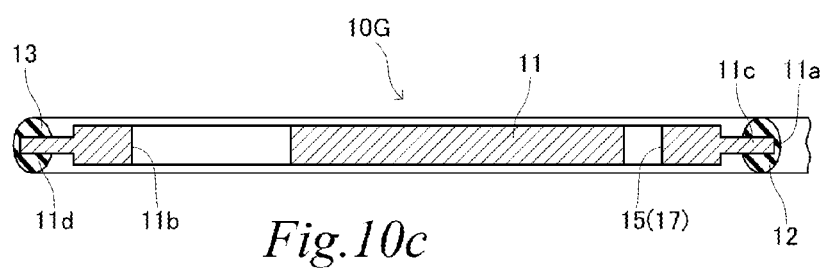

FIG. 10a, FIG. 10b, FIG. 10c show the second embodiment of the gasket of the present invention. FIG. 11 and FIG. 12 show the modifications. In these embodiments, the easily-deformable portion 15 is constituted with a through hole 17 formed on the core member 11 in the form of a sheet. The whole shape of a gasket 10G, the inner and outer seal-forming thin portions 11c, 11d, and the inner and the outer seal portions 12, 13 of the gasket 10G in FIG. 10a, FIG. 10b, FIG. 10c are formed in the same manner as those of the above-mentioned embodiments. The through hole 17 constituting the easily-deformable portion 15 is intermittently provided at six positions around the inner seal portion 12. The through hole 17 provided at six positions is in the form of a circular slot around the circular arc concentric with the opening 11a. The core member 11 in the vicinity of the through hole 17 easily deforms following heat expansion or distortion of the flange portions 51, 52 because the easily-deformable portion 15 is constituted with the slot-like through hole 17, thereby keeping seal ability of the gasket 10G. In addition, the through hole 17 reduces the weight of the core member 11.

In this embodiment, the core member 11 can be a three-layer structure as mentioned in the embodiment of FIG. 5. The opening 11a, the fastening bolt holes 11b, 11b and the through holes 17 are punched out of the core member 11 with a three-layer structure. Other structures are the same as the embodiment in FIG. 2 and the explanation is omitted here.

Figure 11A:
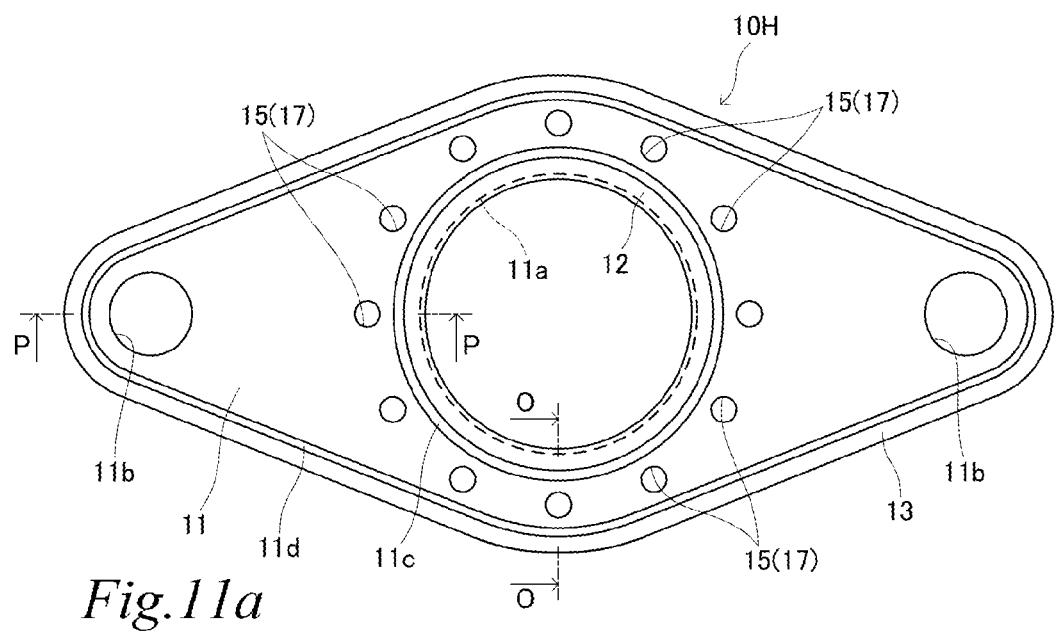
FIG. 11a is a plan view showing a modification of the above-mentioned embodiment.
Figure 11B:
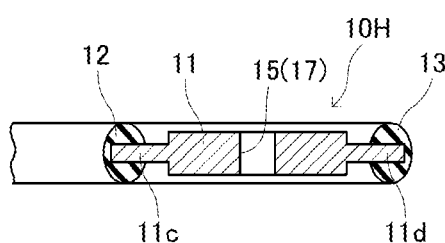
Figure 11C:
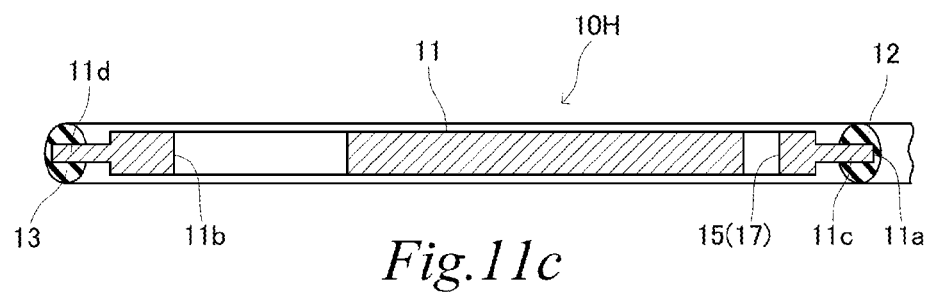

FIG. 11a, FIG. 11b, FIG. 11c show another modification of the second embodiment of the gasket of the present invention. The whole shape of a gasket 10H, the inner and outer seal-forming thin portions 11c, 11d, and the inner and the outer seal portions 12, 13 of the gasket 10H in the modification are formed in the same manner as those of the embodiment in FIG. 10. The through hole 17 constituting the easily-deformable portion 15 is an aperture. The modification is different from the embodiment in FIG. 10 in that twelve through holes 17 (apertures) are formed along the inner seal portion 12 at equal intervals around the circle concentric with the opening 11a. The core member 11 around the through hole 17 easily deforms following heat expansion or distortion of the flange portions 51, 52, thereby keeping seal ability of the gasket 10H. In addition, the through hole 17 reduces the weight of the core member 11. In this embodiment, the core member 11 can be a three-layer structure as mentioned in the embodiment of FIG. 5. The opening 11a, the fastening bolt holes 11b, 11b and the through holes 17 are punched out of the core member 11 with a three-layer structure. Other structures are the same as the embodiment in FIG. 2 and the explanation is omitted here.

Figure 12A:
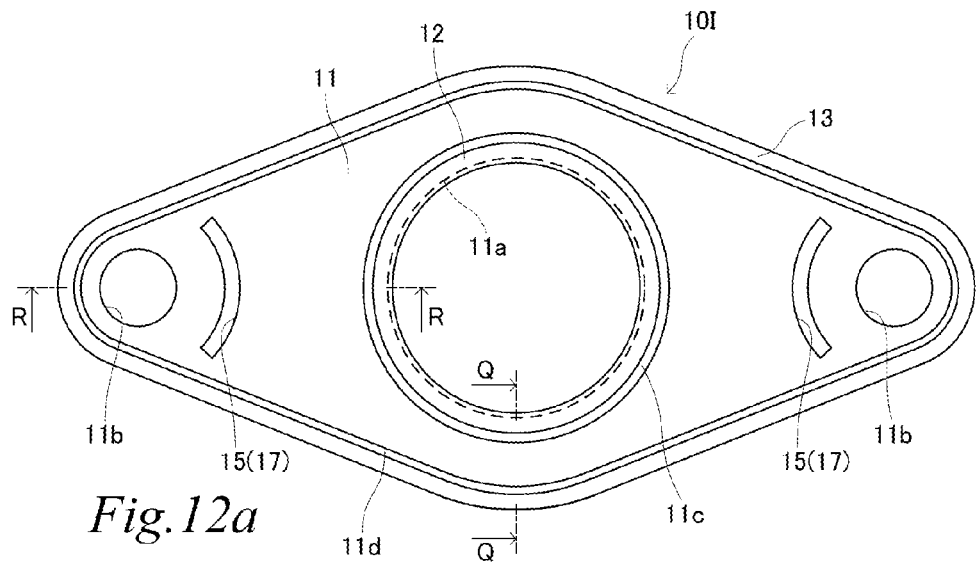
FIG. 12a is a plan view showing another modification of the above-mentioned embodiment.
Figure 12B:
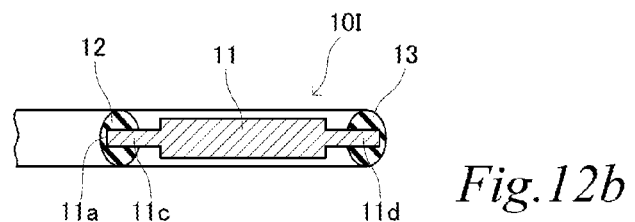
Figure 12C:
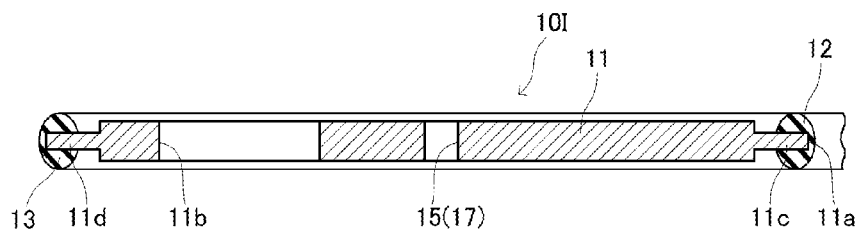

FIG. 12a, FIG. 12b, FIG. 12c show another modification of the second embodiment of the gasket of the present invention. The whole shape of a gasket 10I, the inner and outer seal-forming thin portions 11c, 11d, and the inner and the outer seal portions 12, 13 of the gasket 10I in the modification are formed in the same manner as those of the embodiment in FIG. 10. The gasket in the modification is different from those shown in FIG. 10 and FIG. 11 in that the through hole 17 constituting the easily deformable portion 15 is in the form of a circular slot concentric with the fastening bolt hole 11b in the vicinity of the fastening bolt hole 11b. The core member 11 around the through hole 17 easily deforms following distortion caused at the time of fastening with screws because the circular slot-like through hole 17, formed as the easily-deformable portion 15, is formed in the vicinity of the fastening bolt holes 11b, thereby keeping seal ability of the gasket 10I. In addition, the through hole 17 reduces the weight of the core member 11. Furthermore, deformation such as distortion caused by fastening with screws is effectively inhibited from being transmitted to other portions because the slot-like through hole 17 is formed in the vicinity of the fastening bolt holes 11b.

In this embodiment, the core member 11 can be a three-layer structure as mentioned in the embodiment of FIG. 5. The opening 11a, the fastening bolt holes 11b, 11b and through holes 17 are punched out of the core member 11 of three-layer structure. Other structures are the same as the embodiment in FIG. 2 and the explanation is omitted here.

Figure 13A:
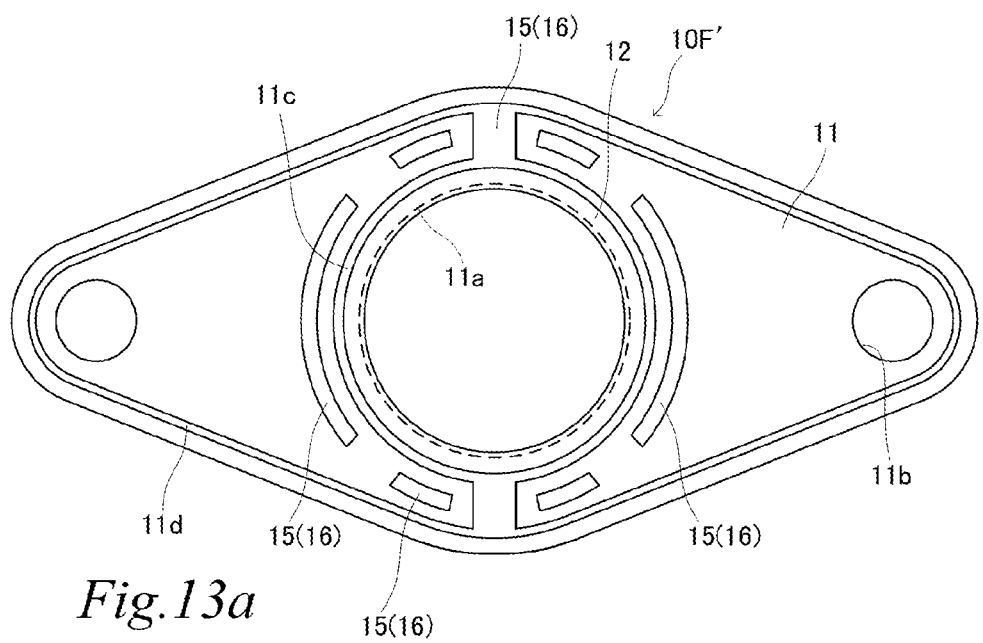
FIG. 13a and FIG. 13b are plan views showing modifications of the embodiment of FIG. 9.
Figure 13B:
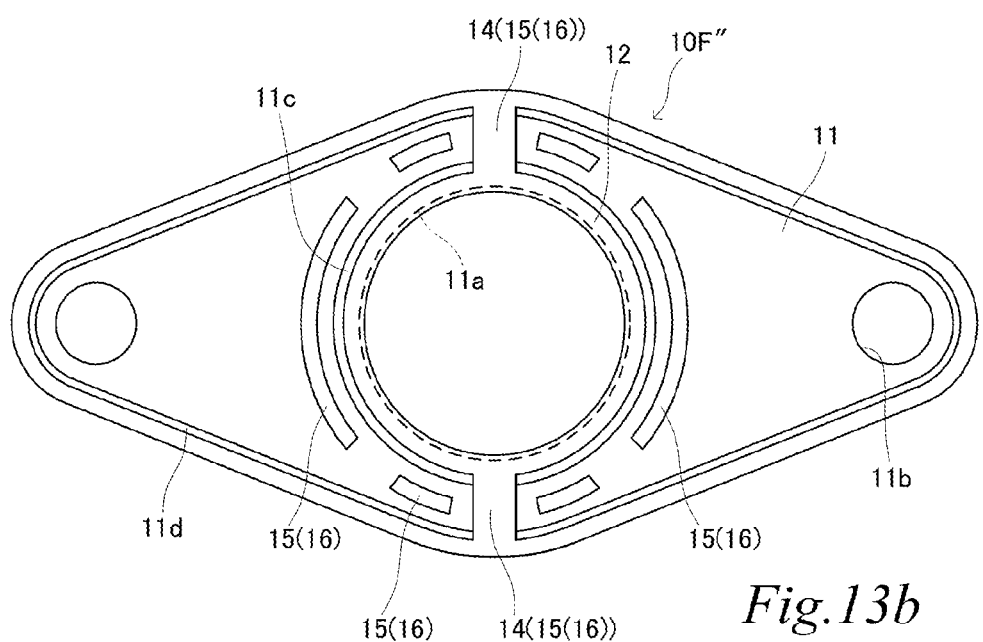

FIG. 13a and FIG. 13b show another modification of the embodiment of FIG. 9. A gasket 10F' shown in FIG. 10a is a combination of the gasket 10F in FIG. 9 and the gasket 10 in FIG. 2, FIG. 3. Some thin portions 16 of the gasket 10 in FIG. 2 and FIG. 3 are replaced with the thin portions 16 of the gasket 10F in FIG. 9 at the corresponding positions. Such a combination remarkably achieves the effect of the easily-deformable portion 15. The gasket 10F" shown in FIG. 13b has the joint portion 14 shown in the embodiment of FIG. 4 on both sides of the thin portion 16 which is replaced in FIG. 10a. Therefore, the above-mentioned effect of the joint portion 14 is added to the embodiment in FIG. 13a. The easily-deformable portion 15 or the joint portion 14 shown in FIG. 2, FIG. 3, or FIG. 4 can be combined with the embodiments shown in FIG. 10 to FIG. 12 and the combinations as shown in FIG. 13a and FIG. 13b can be constituted.

The thin portion 16 and the through hole 17, constituting the easily-deformable portion 15, are not limited to those shown in the figures and other embodiment can be applied as long as they deform following heat expansion or distortion caused in the flange portions 51, 52. The whole shape of the gasket, the number of fastening bolt holes 11b, and the sectional shapes of the inner and outer seal-forming thin portions 11c, 11d are not limited to those shown in the figure. The examples of the application of the gasket 10 (10A to 10I) of the present invention are exemplified to be used for the connection portion 5 in the chain case 3 shown in FIG. 1; however, the gasket of the present invention can be used for other structures which may cause heat expansion or distortion on the attachment face.

REFERENCE SIGNS LIST 10, 10A to 10I gasket
11 core member in the form of sheet
11a opening
11b fastening bolt hole
11c inner seal-forming thin portion
11d outer seal-forming thin portion
12 inner seal portion
13 outer seal portion
14 joint portion
15 easily-deformable portion
16 thin portion
17 through hole

The invention claimed is:

1. A gasket configured to seal a space between two members by being interposed between attachment faces of the two members and by being compressed therebetween, the gasket comprising:
   a core member, the core member being of a flat plate and having an opening; an inner seal portion, the inner seal portion being made of elastic material and formed along an inner circumference of the opening; and an outer seal portion, the outer seal portion being made of elastic material and formed along an outer circumference of the core member;
   the inner seal portion being formed so as to be surrounded by the outer seal portion;
   the core member comprising: a seal-forming thin portion, a plurality of easily-deformable portions, and other portions, the seal-forming thin portion having a thickness that is thinner than the other portions of the core member so as to form the inner seal portion at the inner circumference and to form the outer seal portion at the outer circumference, and the easily-deformable portions being provided between the inner seal portion and the outer seal portion and being configured to easily deform the core member;
   the inner seal portion and the outer seal portion being respectively provided for a front face and a back face of the seal-forming thin portion;
   a plurality of fastening bolt holes provided on the other portions of the core member between the inner seal portion and the outer seal portion,
   a distance between the inner seal portion and the outer seal portion at any regions on which the fastening bolt hole is provided being larger than a distance between the inner seal portion and the outer seal portion at a region any regions in which the easily-deformable portions are provided, and the easily-deformable portions each comprising a thin portion, the thin portion being continuously formed with the seal-forming thin portion of the inner seal portion and the seal-forming thin portion of the outer seal portion, and the thin portion having a joint portion made of elastic material, the joint portion being configured to be joined with the inner seal portion and the outer seal portion.

2. The gasket as set forth in claim 1, wherein the easily-deformable portions are formed between the plurality of fastening bolt holes and is independently formed from the fastening bolt holes, two fastening bolt holes are provided on the other portions of the core member so as to interpose the opening formed at a center of the core member, and the easily-deformable portions are located along a line equidistant from the fastening bolt holes and perpendicular to a line between the fastening bolt holes.

3. The gasket as set forth in claim 1, wherein the easily-deformable portions are formed between the fastening bolt holes.

4. The gasket as set forth in claim 1, wherein the easily-deformable portions are formed between the inner seal portion and the fastening bolt hole or between the outer seal potion and the fastening bolt hole.

5. The gasket as set forth in claim 1, wherein the easily-deformable portions are formed at a plurality of regions of the core member.

6. The gasket as set forth in claim 2, wherein the easily-deformable portions are formed at a plurality of regions of the core member.

7. The gasket as set forth in claim 3, wherein the easily-deformable portions are formed at a plurality of regions of the core member.

8. The gasket as set forth in claim 4, wherein the easily-deformable portions are formed at a plurality of regions of the core member.

9. The gasket as set forth in claim 1, wherein the easily-deform able portions have substantially the same thickness as that of the seal-forming thin portion.

10. The gasket as set forth in claim 1, wherein the inner seal portion is formed along a whole inner circumference of the opening and the outer seal portion is formed along a whole outer circumference of the core member.

11. The gasket as set forth in claim 2, wherein the core member is formed substantially in a lozenge shape, the fastening bolt holes are formed on one of diagonal lines of the core member in such a manner that the fastening bolt holes constitute a pair with the opening interposed therebetween and a pair of the easily-deformable portions is formed on the other of diagonal lines of the core member in such a manner that the easily-deformable portions constitute a pair with the opening interposed therebetween.

12. The gasket as set forth in claim 1, wherein the inner seal portion is configured to seal the space between the two members so as to prevent a fluid flowing through the opening from leaking to the space between the two members.

* * * * *